United States Patent [19]

Stratienko

[11] 4,065,232
[45] Dec. 27, 1977

[54] LIQUID PUMP SEALING SYSTEM

[76] Inventor: Andrew Stratienko, 8503 Elliston Drive, Philadelphia, Pa. 19118

[21] Appl. No.: 566,078

[22] Filed: Apr. 8, 1975

[51] Int. Cl.² .................................. F04B 17/00
[52] U.S. Cl. ............................ 417/368; 415/112; 415/175
[58] Field of Search ............. 417/424, 902, 368, 40; 92/83; 415/175, 111, 112, 53; 137/209

[56] References Cited

U.S. PATENT DOCUMENTS

| | | | |
|---|---|---|---|
| 1,925,334 | 9/1933 | Mendenhall et al. | 417/424 |
| 2,038,131 | 4/1936 | Richard | 415/112 |
| 2,468,704 | 4/1949 | Pippin | 417/424 |
| 2,583,060 | 1/1952 | Paulsen | 137/209 X |
| 2,622,537 | 12/1952 | Wortendyke | 417/424 |
| 2,764,943 | 10/1956 | Peters | 417/424 X |
| 2,839,006 | 6/1958 | Mayo | 417/424 |
| 2,959,133 | 11/1960 | Erwin | 417/424 X |
| 3,379,132 | 4/1968 | Wagner | 417/40 |
| 3,408,942 | 11/1968 | Davenport et al. | 417/424 X |
| 3,513,942 | 5/1970 | Sato | 417/424 X |
| 3,652,186 | 3/1972 | Carter | 417/370 |
| 3,744,935 | 7/1973 | Magni | 417/366 X |

FOREIGN PATENT DOCUMENTS

279,448   3/1928   United Kingdom ............... 415/175

OTHER PUBLICATIONS

*Pump Handbook*, McGraw-Hill Book Co., USA, 1976, pp. 3-98.

*Primary Examiner*—William L. Freeh
*Assistant Examiner*—Edward Look
*Attorney, Agent, or Firm*—Paul Maleson

[57] ABSTRACT

An improved system to eliminate a stuffing box or mechanical seal around the rotating shaft of a pump for liquids. The pump and its motor are hermetically sealed, and a pressurized gas pad maintains a liquid seal at the shaft entrance to the pump casing. A suction return line is provided from the seal liquid to the pump suction. A small flow of pumped liquid leaks past the shaft entrance into the seal liquid, then through the return line back to the pump suction. The gas pad and seal liquid are at slightly higher than pump suction pressure.

7 Claims, 5 Drawing Figures

LIQUID PUMP SEALING SYSTEM

BACKGROUND OF THE INVENTION

1. Field of the Invention

This invention relates to hermitically sealed liquid pumps. Certain types of such pumps are known as "canned pumps". It has applicability particularly to those pumps which operate from a rotating shaft, such as turbine pumps and centrifugal pumps in particular. A feature of the pump permits the elimination of a stuffing box or mechanical seal at the point where the rotating shaft enters the pump casing. This type of structure has particular advantage when pumping corrosive, explosive, low boiling point, or toxic liquids, or when pumping refrigerants or any hazardous liquid or slurry. It is useful in the fields of cryogenics and in heat transfer applications. In general, this pump sealing system is useful in applications where it is desired to avoid any leakage of the liquid being pumped.

Some advantages of this system include more stable and reliable operation than has been available before, better control of the liquid level over the pump and below the motor, the possibility of using much lighter gage and weight construction, better motor cooling, the possibility of using smaller frame size motors, and more protection against catastrophe.

2. Prior Art

Liquid sealed pumps and "canned pumps" have been known. Many patents disclose such pumps in general, or isolated portions of the system.

Prior expedients were based on the principle of balancing the pump discharge pressure with the gas pad pressure above the seal. Since pressure varies as a square of flow rate, it is almost impossible to maintain a stable level of liquid in the seal when the pump discharge pressure varies. The liquid level is very sensitive to discharge pressure variations and it was particularly difficult to control the lower liquid level without going to relatively extremely big tanks, of the order of 10-20 larger than in the present invention.

One particular structural and functional difference of the present invention over anything disclosed or suggested by the prior art is that the present invention contemplates a controlled by-pass or return from the quantity of liquid above the seal and forming a part of the liquid seal, to the pump suction. A number of important consequences flow from this concept, as have been briefly mentioned above. There are other specific improvements in the present invention over the teachings of the prior art.

SUMMARY OF THE INVENTION

This invention contemplates a liquid pump in which the liquid to be pumped comes in contact with a rotating shaft. The invention contemplates a means and method for sealing the shaft without the necessity of face seals or other mechanical seals, or stuffing boxes or glands. A deliberate small clearance is provided between the rotating shaft (or its associated rotating structure, such as an impeller hub) and the pump casing or the wear ring or bushing at the place where the shaft enters the casing.

A volume above this place of entry of the shaft is hermetically sealed, together with the motor means. High pressure discharge liquid flows at a controlled rate passed the shaft entrance into a controlled volume of liquid. A gas pad or controlled volume of gas is maintained above the volume of liquid. The motor and the pump are all in one hermetically sealed environment. A regulated by-pass is provided from the liquid seal liquid above the shaft entrance back to the suction or intake line of the pump directly or through a surge tank. This permits a number of advantages, including operation of the hermetic seal at low pressures, approximating the suction pressure rather than the discharge pressure, and therefore the use of lower pressure equipment and fittings, and the structure of standard motors. It has been found to produce a more stable and more reliable seal than hitherto known seals.

Other improvements reside in means to keep corrosive vapors from the pumped liquid away from the motor, means to keep the proximity of hot pump liquids from overheating the motor, means to compensate for sudden pressure surges, or absorption or other loss of the gas pad gas, and the provision of separate safety liquid level controlled gas and liquid make-up systems.

There is provision for preventing gas from the seal tank entering the pump housing and interferring with the pumping action. This provision protects against such tendencies which tend to result from gas expansion, collecting or trapping gas carried in the original pumped liquid, or from inadvertent overfilling of the tank with make-up gas.

An important broad concept of this invention is that the principle is based on a balancing of the flow into the tank from the opening around the pump shaft with the flow out of the tank back to the suction line. Balancing of the flow into the tank and the flow from the tank is understood by the "Law of Continuity". This means that the mass of fluid passing all sections in a stream of fluid per unit of time is the same. In this concept the rate of flow from the pump-discharge through the opening around the shaft into the reservoir always equals the rate of flow from the reservoir tank through the suction return line to suction.

This is in contradistinction to previous broad principles of operation in which it was attempted to balance the gas pressure in the tank against the pump discharge pressure. It is understood that the pressure at the pump shaft opening is the pump discharge pressure. The provision of a low liquid level sensor in the tank, to limit the lower level, has been found to be particularly useful in the present invention. If the tank communicates only with the pump discharge pressure, as in the prior art, there is a square relationship between flow and pressure, resulting in wide fluctuations in tank level. This means that when the discharge pressure fluctuates the flow rate from the tank to discharge line and into the tank from the discharge line varies as the square of pressure fluctuation. A relatively slight pressure drop in the discharge line causes a rapid drop of liquid level in tank with consequent escape of liquid from the tank and entering of gas into the pump, which disrupts the pumping action. Liquid level under this previous principle of operation can be made somewhat less sensitive to variation of discharge pressure by providing the tank 90-95% filled by liquid. This necessitates use of an enormously large tank to accommodate the motor above the liquid level and the use of complex liquid controlling provisions.

On the other hand, if there is communication from the tank to both the suction and discharge of the pump, as in the present invention, there is a constantly flowing condition, with liquid flowing from the discharge, through the tank seal system and back into the suction, and, very importantly this results in a linear relationship rather than a square relationship, and therefore, a much reduced fluctuation in tank liquid level.

DESCRIPTION OF THE PREFERRED EMBODIMENTS

Figure 1:
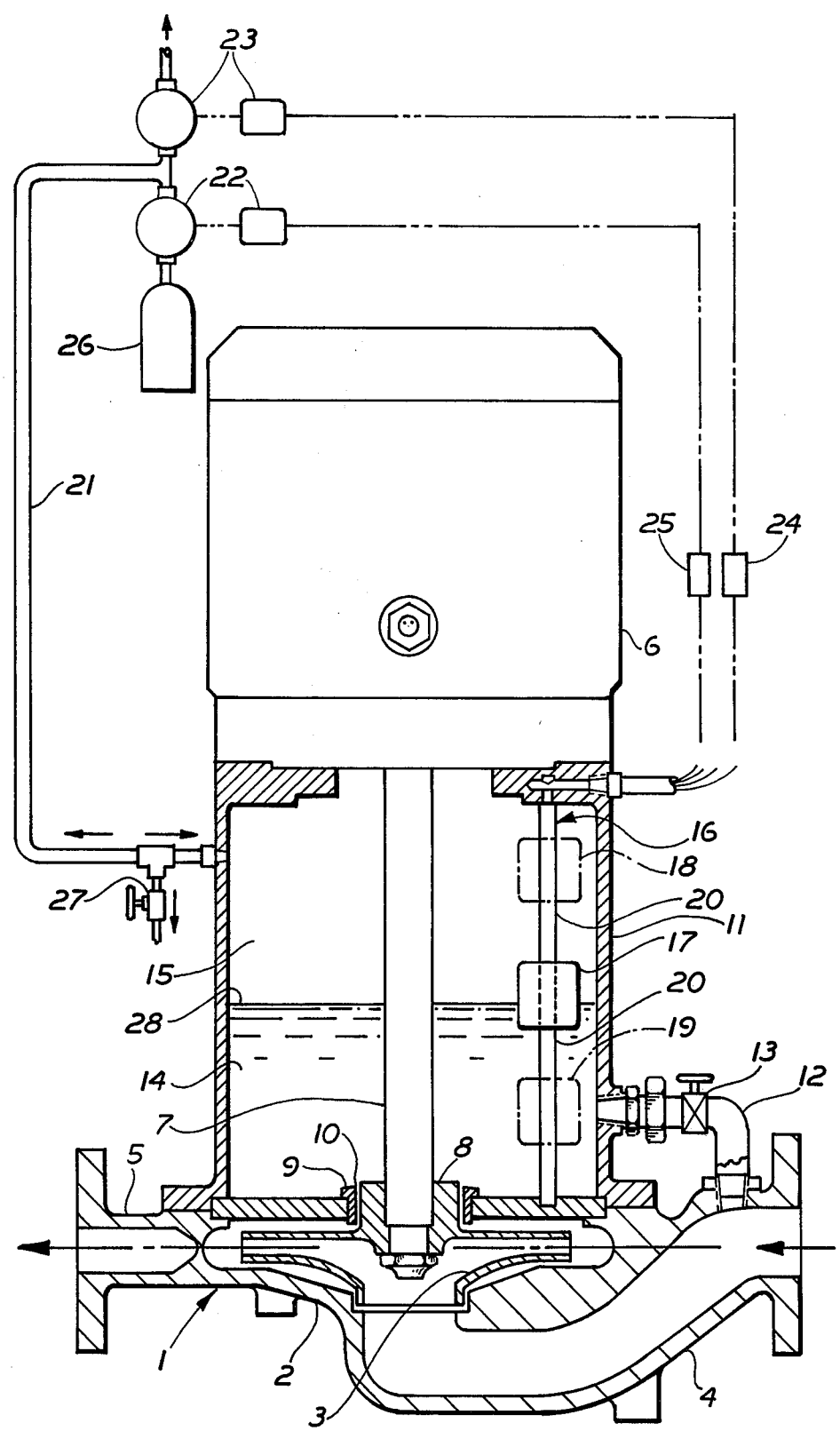
FIG. 1 is a vertical view, partly in cross-section, of the pump sealing system.

The invention is best initially understood in connection with FIG. 1. This is a vertical view, partly in cross-section, of a pump and motor provided with the sealing system. The vertical section is taken along the diametrical center line of the pump and its discharge and suction, in accord with conventional practice.

The pump 1, here shown as a centrifugal pump, comprises a casing 2 and an impeller 3. It is provided as a vertical pump, that is, the impeller rotates in a horizontal plane, and the rotating shaft extends vertically to a motor provided above the impeller.

The casing is provided with a suction 4 and a discharge 5. The detailed structure and operation of the pump itself are not within the scope of this invention.

The impeller 3 of the pump is provided with a hub 8. The hub fits around the lower end of the drive shaft, or extended motor shaft, 7, and is rotated by it. The drive shaft is conventionally coupled to the motor shaft. The upper portion of the casing approaches the projecting portion of the impeller hub 8 at a wear ring or bushing 9. A bearing gap 10 is deliberately provided between the fixed wear ring 9 and the rotating impeller hub 8. The elements comprising the hub 8, the wear ring 9, and the bearing gap 10, and the immediately associated parts, may in general be referred to in the specification as the shaft entrance.

The motor shaft 7 extends upwardly to the motor 6, as is itself conventional. In the preferred embodiment the motor 6 is a totally enclosed nonventilated motor. Such motors are in themselves well known and conventional in the art. Such a conventional motor is however modified to a minor extent so that all its connections, bolt holes, threads and wire openings providing access to the interior of the motor are sealed so that the motor is made completely hermetically sealed and gas proof. Such sealing may be done with ordinary cement-like materials, such as the filled epoxy resins conventionally known to build up parts to be repaired. An important point is that the pressure resisting capabilities required are not severe because the pressures encountered as those which are much closer to the pump suction pressures than the pump discharge pressures.

The motor 6 is connected to and supported on the upper part of the pump casing 2 by means of a tank 11. Preferably, the tank 11 extends downwardly from the lower face of the motor, and, as shown, the tank has a horizontal dimension approximately that of the horizontal dimension of the motor. The tank 11 is hermetically sealed at its upper edge to the motor and at its lower edge to the upper portion of the pump casing. Preferably, this sealing is done by conventional gasketing and bolts. Alternatively, the motor housing may be extended to form an integral skirt which comprises the wall of the tank. The interior of the tank may be generally described as comprising a controlled volume of liquid and a controlled volume of gas, sometimes called a gas pad. The liquid in the tank is called the liquid seal liquid, and the gas in the tank is called the reservoir gas.

A suction return line 12 is provided, running from the tank 11, at a point well below the expected normal liquid level 28, back to the suction 4. This suction return line is sometimes also called a suction by-pass. It is provided with a suction return regulating valve 13.

As described, without more, this sealing system is theoretically operable. However, the additional described system elements are preferably included because of practical considerations. A liquid level sensor 16 is provided within tank 11. The sensor comprises a float guide rod 20. A liquid level sensor float 17 is provided around the rod 20, and is free to float vertically on the rod. The float is shown in the high position at 18, and at a low liquid level position at 19. When the float is at its normal level 17, it contacts no switch and it closes no circuit. At the high position of float 18, a switch, (not shown) is contacted by float on the rod. This closes an electrical circuit to the high level valve control and relay 25. This in turn operates the pressurizing valve and solenoid 22, admitting air or other gas from pressure source 26 into air pressure or venting line 21, and thence into the gas volume 15. The pressure gas source may be a compressed air tank or bottle, preferably of nitrogen, or there can be a connection to any available pressure line of suitable gas available at the site.

When the float is at the low position 19, it contacts a switch (not shown) on the rod 20 and closes a circuit to the low level valve control and relay 24 which in turn operates the venting valve on solenoid 23. When valve 23 operates, it vents line 21 to the atmosphere. Alternatively, it may vent to a conventional gas collector. When the float leaves it high or low position respectively, and moves out of contact with its respective high or low level switch, the control circuit is broken and the respectively operated valve then closes. The electrical and electro-mechanical circuitry for a remote operated electrically actuated valve is very well known and is common in the art, and no invention in that means itself is intended in this invention.

The operation of the basic liquid seal system is explained, without reference to the additional float-control liquid level system. It is understood that dimensions, capacity and other specifications are given as exemplary, and are not intended to be limiting. Exact numerical limitations are not of critical importance in this invention, but the general order of magnitude of various flows and differentials are of course pertinent to the reasonable operation of the system.

For example, we may consider a typical net positive suction head of on the order of 5 PSI, and a discharge pressure of on the order of 75 PSI. At a capacity of approximately 100GPM, a pump having an approximate impeller diameter of 8 inches, and a motor of 10 HP at 3500 RPM may be provided. Under these conditions, the diametrical clearance between the hub 8 and the wear ring 9 may be 0.01 inch. The bearing gap 10 would then be 0.005 inch approximately. At approximately these conditions and with these approximate clearances, the flow of the pumped liquid from the discharge side of the pump through the bearing gap and into the liquid seal 14 is at the rate of about 2 GPM.

As described, the interior of tank 11, below the normal liquid level, is connected through return line 12 back to the suction. It is found that when the system is in operation, the high pressure discharge liquid leaks through the bearing gap 10 into the tank. The rate of flow through the gap is very small in comparison to other dimensions and line and pipe capacities. As the level rises in the tank, it traps and compresses the gas 15, which increases in pressure until a point of stability or equilibrium is reached, and liquid level 28 stabilizes. The leakage flow into the tank through the gap continues. The flow returns to the suction through the return line 12. The pressure of the gas 15 in the tank is just slightly above the suction pressure. Thus, preferably if the suction pressure is 5 PSI, the measured gage pressure in the tank or reservoir 11 also reads at about 5 PSI with ordinary instruments. The slight elevation of the pressure in the tank above the suction is so small as not to be measurable with ordinary engineering instruments in the field, and for the purposes of this invention, the pressure in the tank is variously described as being just slightly in excess of suction pressure or, at suction pressure. It is not necessary to define the pressure with more precision, because it is not set at this pressure; the equilibrium results from the geometry and dynamics of the system.

It is preferable that the tank pressure exceed the pump suction pressure only by the amount of the static loss between them. Alternatively, nevertheless, the desirable effect of this invention begins as soon as valve 13 is cracked, permitting flow. As the valve 13 is further opened and the pressure differential decreases, the most desired operating condition is approached.

Whether the discharge pressure rises or falls, or the suction pressure rises or falls, in all cases, the liquid level 28 tends to go to a stable equilibrium position. As has been previously explained, a change in pump discharge pressure produces enormously less liquid level 28 variation than occurs in previously known systems.

It has been found that a sealing means constructed and operated as set forth above is far superior to one in which there is simply a trapped volume of gas with no return line back to suction, or one in which there is a connection to discharge. The system of the present invention has been found to be more stable, reliable and less subject to failure at extreme conditions than other expedients.

If there were no return line back to suction, the leakage through bearing gap 10 would build the pressure in the tank 11 up to the discharge pressure, which would necessitate much more expensive and heavy tank construction, gasketing, etc., and make a more dangerous and more difficult to control system. Furthermore, if the tank pressure is at the pump discharge pressure, it is apparent that when the pump is off and there is no discharge head, the pressure in the tank will slowly fall through a very large range of pressure, which in turn produces a large change in liquid level 28, and the possible loss of gas from the tank into the pump.

In spite of the intrinsic stability of the basic system as described above, it is desirable to provide additional means to back up the inherent workings of the system.

The operation of a preferred such back up system is described below.

Under normal operating condidtions, the liquid level sensor float 17 is at an intermediate vertical position in the tank and does not operate. If the liquid level 28 falls dangerously low, so that there is danger of gas leaking back into the main pumping system, the float falls to level 19, and, acting through control and relay 24, opens the venting valve 23. This permits gas in the interior of the tank to vent through line 21. The reduction in gas pressure permits the liquid level 28 to rise again. As the liquid level rises, the float disengages from contact with its switch on the rod 20, and the venting valve closes.

On the other hand, if liquid level 28 rises too high as to threaten the motor, the float goes to its high position 18, contacts a switch on the rod, and, acting through the control and relay 25, opens valve 22 to a pressure source 26. Pressure source 26 may conveniently be a commercial steel bottle of compressed nitrogen, connected to valve 22 through a pressure reducing valve. The make-up gas flows through line 21 into the tank and acts to lower the liquid level. When the level falls, the float 18 disengages from its switch, and the pressurizing valve 22 shuts off.

It is understood that various additional sophistications of refinements in the float, relay, valve system for liquid level control are well within the knowledge of the art in themselves. For example, to avoid hunting, it is possible to incorporate a pair of vertically spaced apart switches at each of the high level and low level. Considering the high level, the highest switch is the make-up switch which pressurizes the line to the tank, and the lowest of the switches is the break switch, which closes the pressurizing valve 22.

It is apparent that this back up system as described above, protects the liquid seal system from the effects of radical changes and pressure balance, or the accidental introduction of additional gas into the tank because of gas entrapped in the fluid being pumped, or the loss of gas in the tank because of absorption into the liquid being pumped.

Valve 27 is a manual flashing or rent valve to aid in setting the system manually. Valve 13 is a suction return line regulating valve, which is an aid in setting the system manually. Normally, once the system has been installed, there should be no necessity to adjust either of valves 13 or 27.

Figure 2:
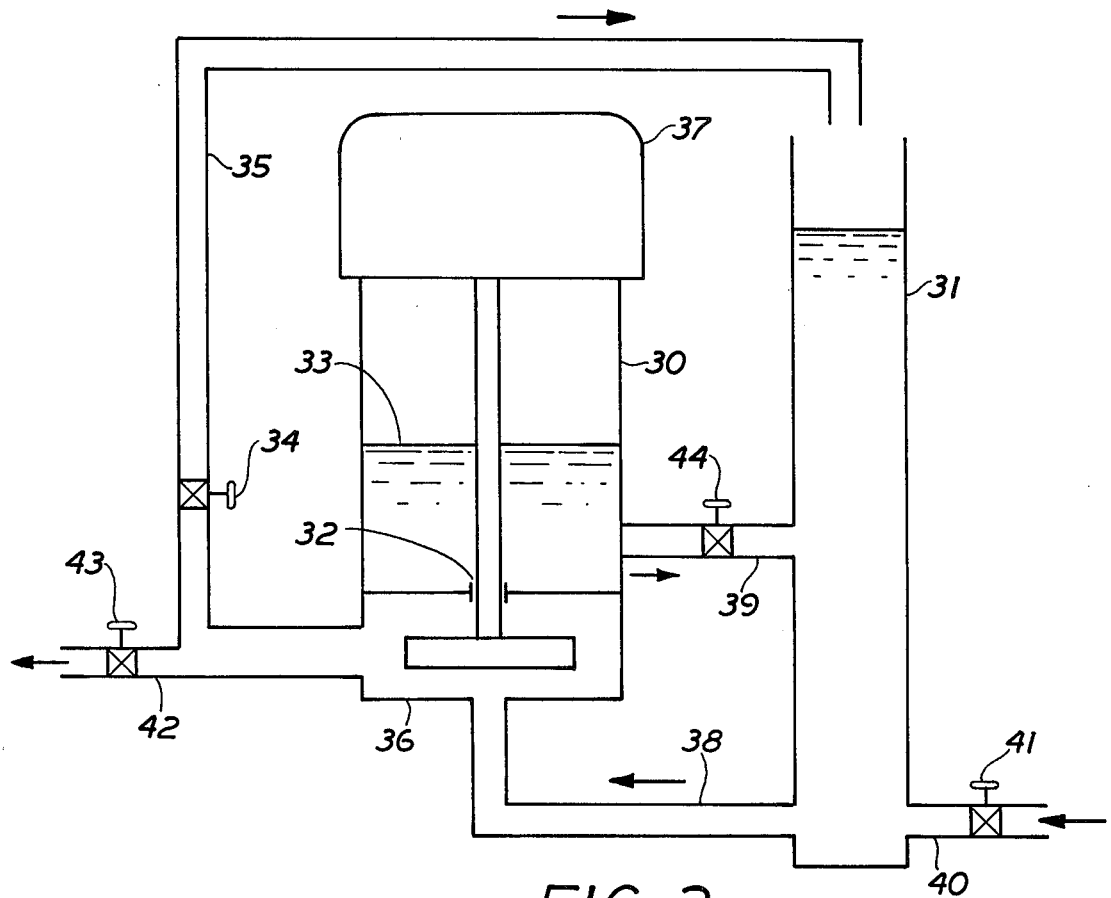
FIG. 2 is a schematic diagram of a demonstration system illustrating the operation.

FIG. 2 shows in a schematic, idealized way, a slightly modified alternate embodiment of the invention. With suction valve 41 closed, so that there is no flow through suction line 40, and discharge valve 43 close so there is no discharge for suction line 42, the system shown in FIG. 2 is a closed one which is useful for demonstrating the operation of the liquid seal system. A vertical centrifugal pump 36 is provided, driven by motor 37. Tank 30 is provided between the motor and the pump, all is generally explained above in connection with FIG. 1. A surge tank 31 is provided. The surge tank line or suction return line 39 runs from the lower portion of tank 30 to the surge tank 31, and a regulating valve 44 is provided in this line. The level of liquid in tank 30 is indicated at 33. Loop discharge line 35 runs from the pump discharge back to the surge tank 31, and its flow is controlled by loop discharge line valve 34. Loop suction line 38 runs from the bottom of the surge tank to the pump suction.

When valves 41 and 43 are closed, the system operates as a closed demonstration loop. Its operation is generally as described in connection with FIG. 1. When the pump starts, discharge pressure liquid flows into tank 30 through bearing gap 32, raising liquid level 33 until the gas pressure equals the gravity head pressure in the open surge tank 31. At this point, the liquid leaking into the tank through bearing gap 32 flows through surge tank line 39 into the surge tank 31, so that the rate of flow through gap 32 equals the rate of flow through line 39.

The liquid level 33 is very stable for any given condition of pump operation because of the novel principle which has been described. However, as a further theoretical safety factor, if the level tends to drop, the pressure of the gas pad above the level 33 decreases, thus increasing the pressure differential between the pump discharge and tank 30 and also decreasing the pressure differential between tank 30 and surge tank 31. This condition increases the leakage flow through bearing gap 32 into the tank and decreases the flow out of the tank through line 39, thus tending to re-establish the previous liquid level.

Similarly, also considered as an additional theoretical safety factor, if the liquid level 33 tends to rise, it decreases the gas volume and hence increases its pressure, which tends to increase the pressure differential between tank 30 and surge tank 31 and also decrease the pressure differential between the pump discharge and tank 30. This condition tends to decrease flow from the pump to the tank, and increase the flow from the tank to the surge tank, thus tending to re-establish the previous liquid level.

The effect of regulation of the manual regulating valves will be discussed. If the orifice in suction return line or surge tank line 39 is decreased, the flow rate from tank 30 to surge tank 31 is reduced, and liquid level 33 rises and increases the tank pressure to maintain the flow rate from tank 30 equal to the leakage flow rate into the tank 30. If the orifice in the pump discharge line is decreased, the pump discharge pressure increases, which increases the leakage flow rate through bearing gap 32 into the tank 30, and hence raises liquid level 33, increasing the gas pressure, which in turn increases the outflow through line 39.

Thus, the liquid level 28 or 33 goes to stability at any discharge or suction pressure by reason of what may be called the balanced liquid flow principle.

Figure 3:
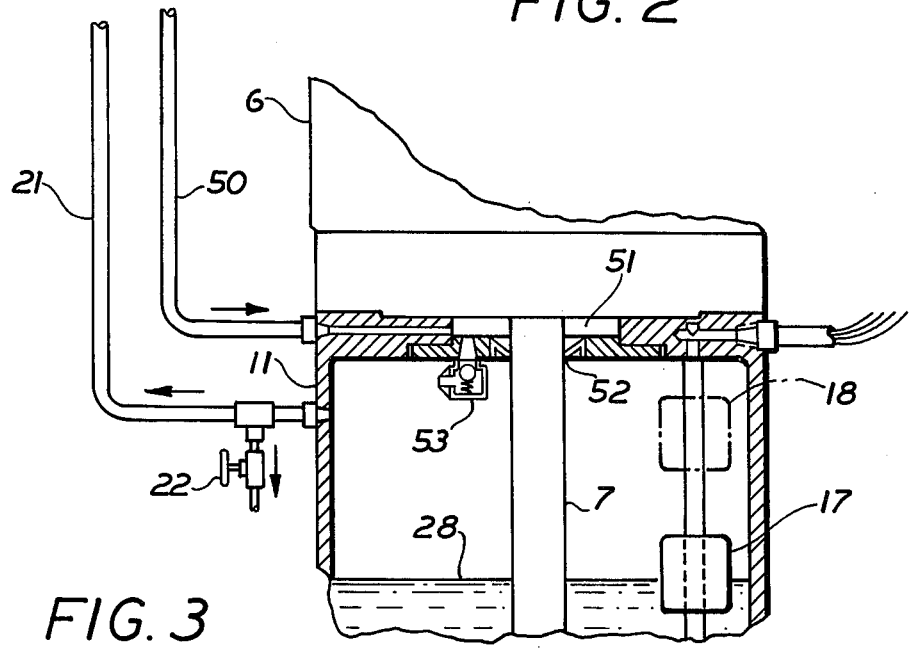
FIG. 3 is a schematic, fragmentary vertical view, partially in cross-section, showing means for keeping noxious vapors away from the motor.

FIG. 3 is a fragmentary vertical section of the top portion of the tank 11 and bottom portion of the motor 6. This is an alternate embodiment of the liquid seal system including means to keep fumes from the pumped liquid away from the motor, in situations where such fumes might be harmful to the motor.

In this embodiment, line 21 is only used as a venting line. Pressurizing is done through a separate pressurizing and sweep gas line 50. The structure and operation of this embodiment are the same as described in connection with FIG. 1 except and to the extent as specified to be different. A flow of gas passes through line 50 into a sweep chamber 51 surrounding the motor shaft 7 at the motor bearing. A lip type seal 52 is provided around the shaft. The sweep gas flows into tank 11 through check valve 53. If flashing or vent valve 22 is left slightly cracked open, there is a constant flow of sweep gas away from the motor, at its bearing, into the tank 11, thus keeping vapors and fumes from the motor. This flow is of course small in rate. Even with valve 22 closed, there is a sweep effect. When it is desired or required to provide make-up gas, in accord with the other teachings of this invention, an increased flow of pressurized gas is provided through line 50. Under those circumstances, the increased flow enters tank 11 through check valve 53. When there is not such an excess of gas flow as to require the check valve to open, it remains closed, thus preventing any leak back of vapor into proximity to the motor.

Figure 4:
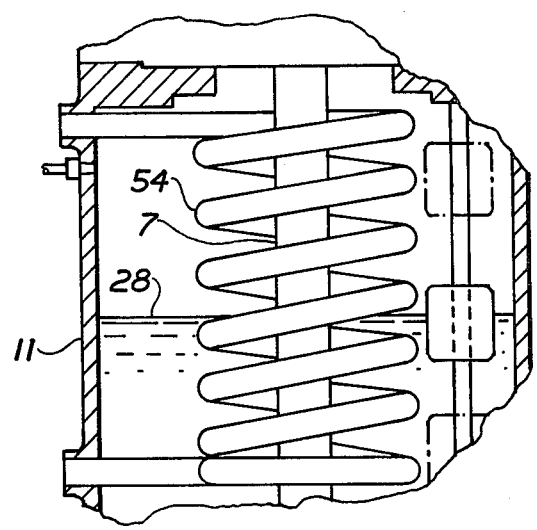
FIG. 4 is a fragmentary, schematic, vertical view, showing means for protecting the motor from the heat of the hot pumped liquids.

In FIG. 4, there is shown a fragmentary vertical view of part of tank 11, with shaft 7 running through it. This is an alternate embodiment or modification useful when the pumped liquid is hot, and its heat might interfere with the proper cooling or running temperature of the motor. A cooling coil 54 is provided inside tank 11 around the shaft, or elsewhere in the tank, and cooling water is circulated through the coil. This keeps the liquid in the liquid seal at a suitably low temperature. There is not a heavy burden on this cooling system, since the rate of introduction of hot pumped liquid is small. Alternatively, the cooling means 54 may be external the tank.

Figure 5:
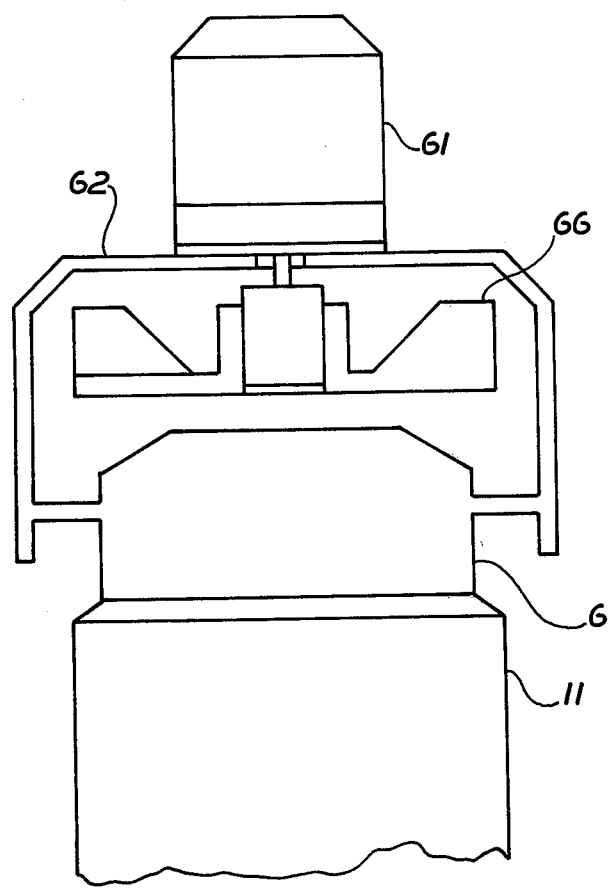
FIG. 5 is a schematic, simplified vertical view showing means for utilizing totally enclosed nonventilated motor with the H.P. rating of a totally enclosed fan cooled motor.

In FIG. 5, there is shown in a simplified vertical view, an alternate embodiment wherein a totally enclosed non-ventilated motor is used. The motor is sealed hermetically as described above. Since the housing of the motor 6 extends above tank 11, an external fan 66 is provided, driven by its own small fan motor 61. The external fan and its motor are supported in any convenient manner on support 62. In all of alternate embodiments, all structure and operation remains as described in connection with FIG. 1, except where specifically modified.

The term substantially at pump suction pressure, when applied to pressure in the reservoir tank, includes small deviations from the exact suction pressure, as explained above. The tank pressure may be described as being on the order of the pump suction pressure. The term normal range when applied to the liquid level in the reservoir tank, means the liquid level variation which does not actuate either venting or pressurizing. The cooling coil in FIG. 4 is broadly a heat exchanger and the cooling water is broadly a cooling medium.

The term "shaft" and "shaft entrance" as used in the claims includes reference to the motor shaft, the pump shaft, or any extension thereof.

The seal 52 in FIG. 3, is shown and described as a lip seal. Alternatively, it may be a magnetic seal or any other conventional seal.

An important specific advantage of the low (pump suction) pressure in the reservoir is that the standard shell of ordinary totally enclosed motor, slightly modified to seal its openings for wires, etc. can withstand this pressure, whereas it might not withstand pump discharge pressures.

The scope of this invention is to be determined by the appended claims.

I claim:

1. In the combination of a motor, a pump having a discharge and a suction, a rotatable shaft extending vertically downward from said motor, said shaft being operatively connected to said pump at a shaft entrance, a liquid pump sealing system comprising the elements:

a reservoir tank hermetically sealed to said pump around said shaft entrance and to the interior of said motor, said reservoir tank being partially filled with pumped liquid, said reservoir tank having a normal inherently stable liquid level range, a volume of gas in said reservoir tank above said liquid level, said gas being at the order of and slightly in excess of the suction pressure at said pump, said gas being displaced within said reservoir tank solely responsive to a differential pressure between said reservoir tank and said suction a bearing gap between said shaft and said pump at said shaft entrance, one side of said gap communicating with said discharge of said pump and the other side of said gap communicating with the interior of said reservoir tank, a suction return bleed line communicating from said reservoir tank to said pump suction, to provide a continuous flow of liquid from said pump discharge through said bearing gap into said reservoir and a continuous flow from said reservoir through said suction return bleed line to said pump suction, said flow being controlled responsive to pressures of said gas within said reservoir tank, said continuous flows inherently tending to equal each other, and to provide a normal inherently stable liquid level range in said reservoir tank above said suction return bleed line and below the top of said reservoir tank, said elements being the sole necessary means to maintain said liquid level inherently stable within said range during normal pump operation, said reservoir tank including means to sense said liquid level, a pressurized gas source controllably communicating with said reservoir tank through a pressurizing valve, a vent controllably communicating with said reservoir tank through a venting valve, said liquid level sensor being operatively connected to said valves to open said pressurizing valve when said liquid level rises above said normal range, and to open said venting valve when said liquid level falls below said normal range, and to close both said valves when said liquid level is within said normal range.

2. A liquid pump sealing system as set forth in claim 1 wherein said reservoir tank is hermetically sealed to a face of said motor around said shaft, and the shell of said motor, the casing of said pump, and said reservoir tank together form a hermetically sealed volume.

3. A liquid pump sealing system as set forth in claim 1 wherein,
said suction return line is provided with a regulating valve and said reservoir tank is provided with a gas flashing valve above said normal liquid level range.

4. A liquid pump sealing system as set forth in claim 3 wherein,
said system includes a surge tank, said surge tank communicating with said reservoir tank.

5. A liquid pump sealing system as set forth in claim 3 wherein,
a sweep gas system is provided to sweep vapors away from said motor interior, said sweep gas sytem comprising;
a seal around said shaft adjacent said motor,
a sweep gas chamber communicating with said reservoir tank through a check valve set to permit flow into said tank,
a sweep gas line communicating with said sweep gas chamber, and a source of pressurized gas, said sweep gas line carrying a flow of said gas from said source to said chamber.

6. A liquid pump sealing system as set forth in claim 1 wherein a heat exchanger is provided for cooling liquid in said reservoir tank and a cooling medium is circulated through said heat exchanger.

7. A liquid pump sealing system as set forth in claim 1 wherein a motor cooling fan is provided external to said hermetically sealed reservoir tank, said cooling fan being positioned to direct cooling air against the outer surface of said motor shell.

* * * * *